No. 694,973. Patented Mar. 11, 1902.
B. KUHL.
ICE CREAM FREEZER.
(Application filed May 9, 1901.)
(No Model.) 2 Sheets—Sheet 1.

Witnesses
B. Kuhl, Inventor.
by C. A. Snow & Co.
Attorneys

No. 694,973. Patented Mar. 11, 1902.
B. KUHL.
ICE CREAM FREEZER.
(Application filed May 9, 1901.)
(No Model.) 2 Sheets—Sheet 2.

Witnesses
B. Kuhl, Inventor.
by C. A. Snow & Co.
Attorneys

UNITED STATES PATENT OFFICE.

BURCHARD KUHL, OF ORLANDO, FLORIDA.

ICE-CREAM FREEZER.

SPECIFICATION forming part of Letters Patent No. 694,973, dated March 11, 1902.

Application filed May 9, 1901. Serial No. 59,466. (No model.)

*To all whom it may concern:*

Be it known that I, BURCHARD KUHL, a citizen of the United States, residing at Orlando, in the county of Orange and State of Florida, have invented a new and useful Ice-Cream Freezer, of which the following is a specification.

The invention relates to improvements in ice-cream freezers.

The object of the present invention is to improve the construction of ice-cream freezers and to provide a simple and comparatively inexpensive one adapted to be conveniently operated and capable of rapidly freezing cream and the like.

The invention consists in the construction and novel combination and arrangement of parts hereinafter fully described, illustrated in the accompanying drawings, and pointed out in the claim hereto appended.

Figure 1:
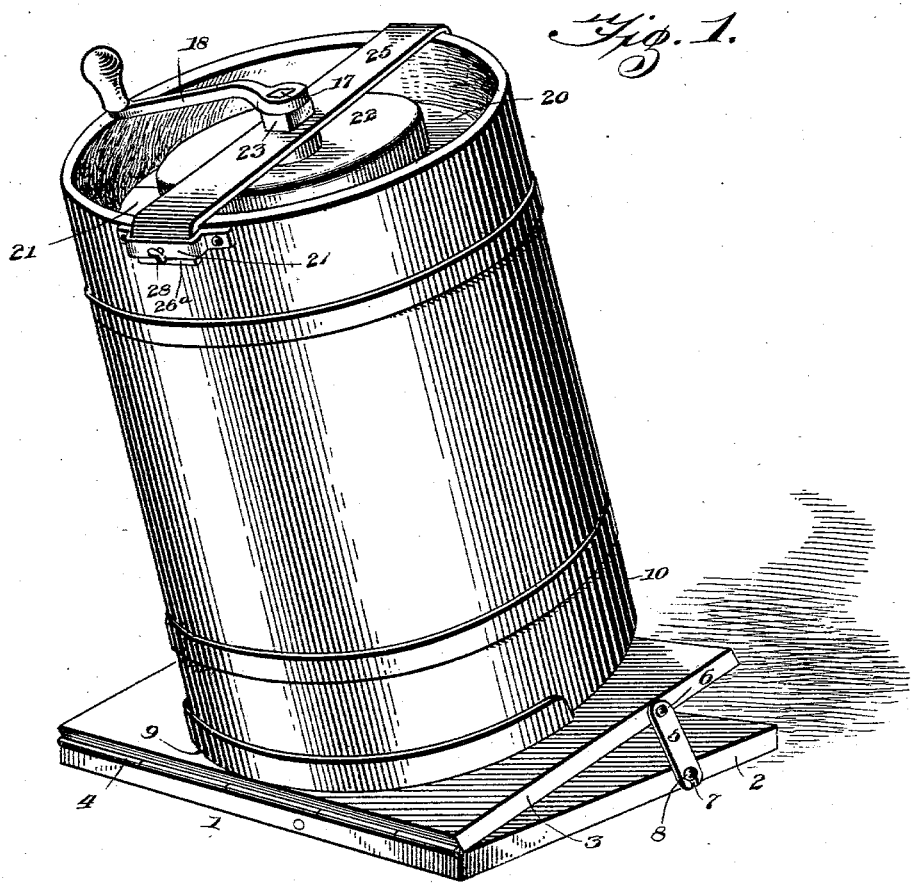
Figure 4:
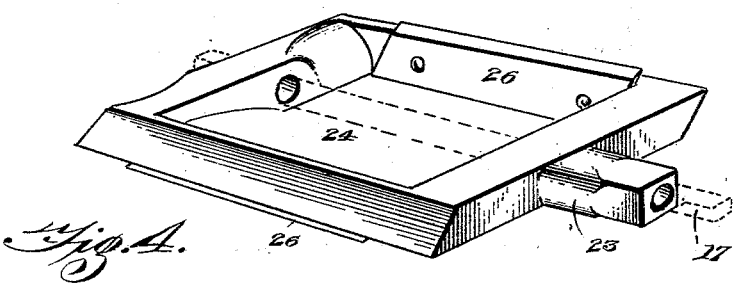
Figure 2:
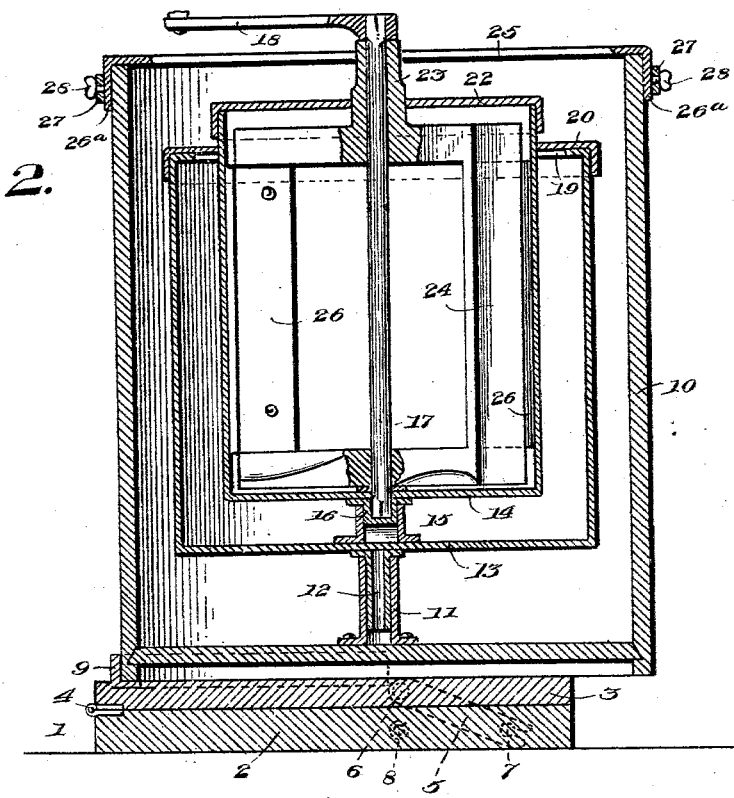
Figure 3:
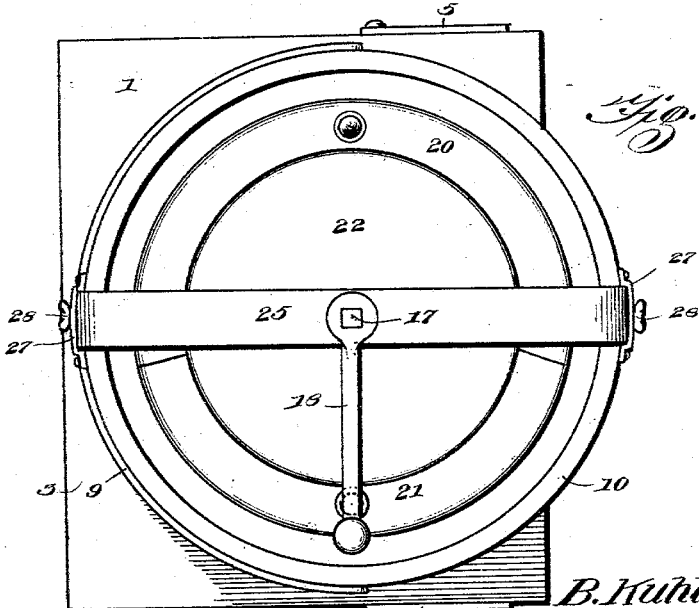

In the drawings, Figure 1 is a perspective view of an ice-cream freezer constructed in accordance with this invention. Fig. 2 is a vertical sectional view. Fig. 3 is a plan view. Fig. 4 is a detail perspective view of the frame which carries the knives.

Like numerals of reference designate corresponding parts in all the figures of the drawings.

1 designates a base composed of a lower horizontal section 2 and an upper section 3, which is hinged to the lower section 2 and which is adapted to be swung upward at an inclination, as illustrated in Fig. 1, to support the ice-cream freezer in an inclined position to facilitate operating the same. The upper section is connected with the lower section by a suitable hinge 4, and it is supported at opposite sides by braces 5, pivoted at their upper ends 6 to the upper section and provided at their lower ends with recesses or bifurcations 7 and adapted to engage projections or studs 8 of the lower section, whereby the upper section is rigidly supported in an inclined position. The hinge may be of any desired construction, and the upper section is provided adjacent to its hinged edge with a curved upwardly-extending flange 9, forming a seat and receiving an outer tub or receptacle 10. The outer receptacle or tub 10 is provided at its bottom with a socket or bearing 11, which receives a depending journal or pivot 12 of an inner receptacle 13, and the latter is adapted to rotate with an ice-cream can 14. The inner receptacle, which is adapted to contain the ice or other freezing mixture employed, is provided at its bottom with an upwardly-extending polygonal socket which receives a depending lug or projection 16 of the can 14, whereby the can and the inner receptacle are interlocked and are adapted to rotate together. The can and the inner receptacle are rotated by a vertical shaft 17, having a squared lower end which fits in a socket formed by the lug or projection 16, which is hollow, and the upper end of the shaft 17 has a crank-handle 18 detachably secured to it. The inner receptacle 13 is provided at its top with an inwardly-extending flange 19, and the space between the inner receptacle and the can is closed at the top during the operation of freezing cream by means of a cover or ring composed of sections 20 and 21 of unequal length, the shorter section 21 being adapted to be readily removed to enable the ice to be salted or to permit ice to be supplied to the freezer.

The can 14 is provided with a cover 22, having a central opening to receive a sleeve 23 of a frame 24, which is held stationary by a cross-bar 25. The frame 24, which is approximately rectangular, is composed of a top and bottom and upright sides, and it is provided with blades 26, which scrape the frozen cream from the sides of the can as the latter is rotated. The sleeve 23, which is provided with a central opening for the shaft, has a polygonal upper portion which fits in a corresponding opening of the center of the cross-bar 25. The cross-bar 25, which holds the frame stationary, has its ends bent downward to form arms 26ª, which are arranged in keepers 27 of the outer receptacle. The loops or keepers 27 of the outer receptacle are provided with clamping-screws 28, mounted in suitable threaded perforations and arranged to engage the arm of the cross-bar, whereby the latter is detachably secured to the outer receptacle.

The sections of the ring or cover are provided with suitable knobs or handles to enable them to be readily placed on and removed from the inner receptacle, and when the ice-cream freezer is arranged in an inclined position, as shown in Fig. 1, it is adapted to be conveniently operated. The braces which support the upper section of the base may be provided with any suitable means for connecting them to the upper and lower sections and may be arranged to adjustably support the hinged upper section to change the inclination of the same.

It will be seen that the ice-cream freezer is simple and comparatively inexpensive in construction, that when the crank-handle is turned the can and inner receptacle will be simultaneously rotated, and that it will enable cream and the like to be quickly frozen. Also the parts are readily removable, and the outer receptacle forms an intervening space between it and the inner receptacle, and when after the operation of freezing has been completed and the freezer is covered by a heavy cloth or the like the intervening space will greatly prevent the ice or other freezing mixture from rapidly melting.

What I claim is—

In a device of the class described, the combination with a stationary outer receptacle provided at its bottom with a bearing, an inner rotary receptacle journaled in the said bearing and provided at its bottom with an interior socket, a rotary can provided with a depending projection interlocked with the said socket, a stationary frame having a blade and provided at its top with an upwardly-extending sleeve projecting through the can and detachably connected with the stationary outer receptacle, and a shaft extending through the sleeve and interlocked with the bottom of the can and provided with means for rotating it, substantially as described.

In testimony that I claim the foregoing as my own I have hereto affixed my signature in the presence of two witnesses.

BURCHARD KUHL.

Witnesses:
E. P. WEST,
H. E. ROLLINS.